Dec. 27, 1955   G. W. DUNNICAN ET AL   2,728,510
DEVICE FOR LEVELING CONTENTS OF JARS AND THE LIKE
Filed May 15, 1953
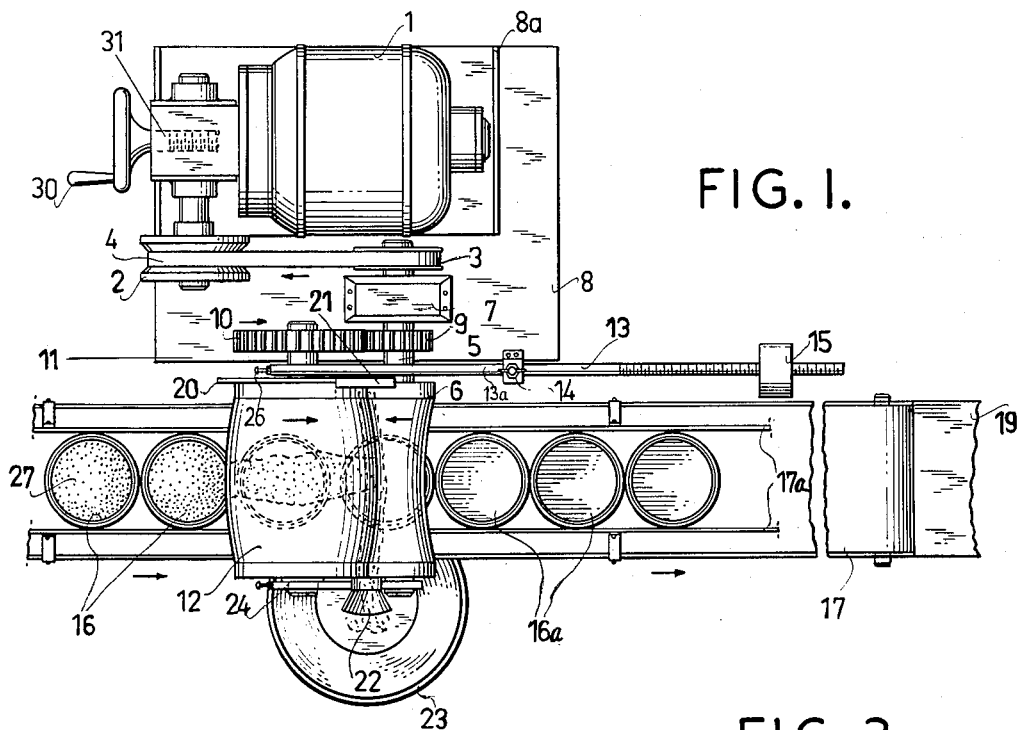
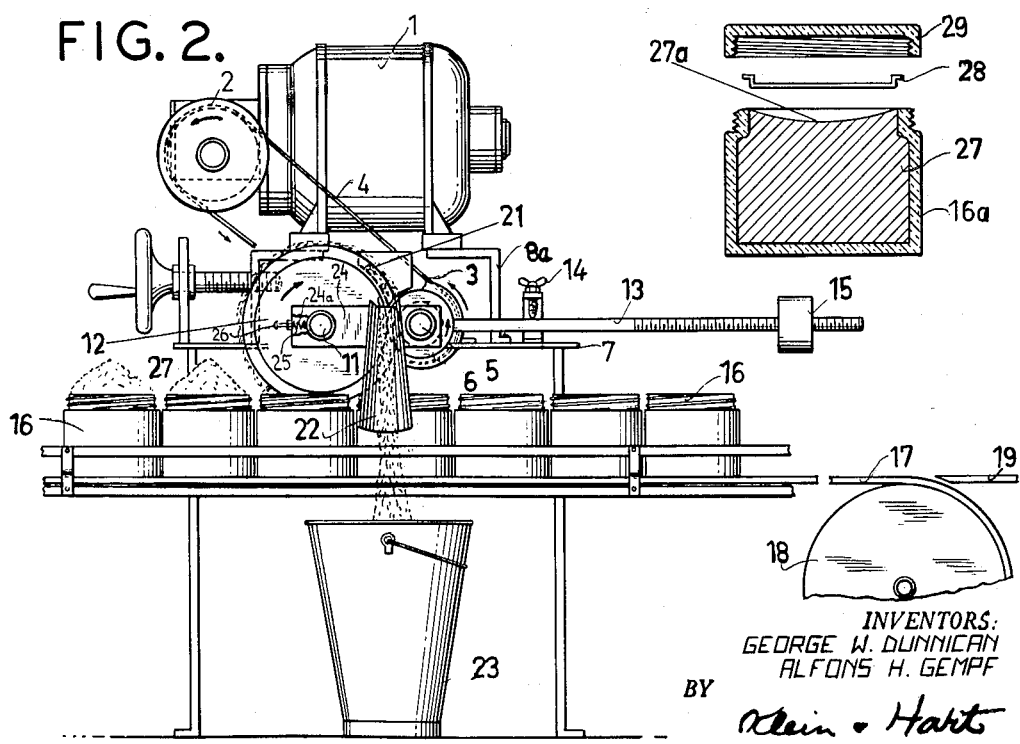
INVENTORS:
GEORGE W. DUNNICAN
ALFONS H. GEMPF
BY
ATTORNEYS.

United States Patent Office 2,728,510
Patented Dec. 27, 1955

2,728,510

DEVICE FOR LEVELING CONTENTS OF JARS AND THE LIKE

George W. Dunnican and Alfons H. Gempf, Clifton, N. J., assignors to Lehn & Fink Products Corporation, Bloomfield, N. J., a corporation of Delaware Application May 15, 1953, Serial No. 355,292

13 Claims. (Cl. 226—22)

The present invention relates to automatic jar trimmers, i. e. devices for leveling the contents of jars filled with cream or the like.

When jars are filled with a cream or similar viscous material, the excess material formed on top must be removed before the cover is applied to the jar, lest this excess material overflow and drip over the sides of the jar. Removal of excess material by hand is slow and inefficient, some of the material often being pushed over the sides of the jar and smearing the same.

Also, it is desirable to place a thin, intermediate protective cover over the cream before applying the jar cover. Such protective covers are preferably provided with a rim to engage the inside edge of the jar top so as to be fitted easily thereon. If the upper surface of the cream is level, the fitting of such a protective cover would replace a small amount of cream and may force it over the jar edge. This may also occur if the volume of the cream expands in the jar after being placed therein. It has, therefore, been found advantageous to make the upper surface of the cream concave rather than level to make it possible to displace small amounts of cream in the jar without causing an overflow.

It is the principal object of the present invention to provide an automatic and efficient method and means for trimming containers filled with a viscous material, such as cream.

It is a more specific object of this invention to provide an automatic and efficient method and means for trimming jars of cream so that the upper surface of the cream is concave.

The above and other objects and advantages are accomplished in accordance with the invention by providing a machine comprising, essentially, a trimming station, means for supporting and continuously moving containers filled with a viscous, creamy material to, through, and from the trimming station, a rotating roller in said trimming station adapted to remove or wipe excess viscous material off the top of the containers as they move through the trimming station, a squeeze roller rotating in the opposite direction and adjacent the wiping roller, and means for removing the excess viscous material from the channel between the rollers. Preferably, the wiping roller is laterally convex, the squeeze roller being accordingly concave.

The invention will be more fully described hereinafter in conjunction with the accompanying drawing illustrating a preferred embodiment of a jar trimmer, wherein Fig. 1 shows a top view of the apparatus;
Fig. 2 is a side view of Fig. 1; and
Fig. 3 shows a trimmed jar, in cross section.

Referring now to the drawing, wherein like reference numbers designate like parts, motor 1 drives pulleys 2 and 3 connected by belt 4. A 1/20-H. P. gearhead motor having an output speed of 86 R. P. M. has been found satisfactory. Pulley 3 is fixedly connected to and rotates axle or shaft 5 of squeeze roller 6. Shaft 5 is mounted in bearing 7 which is supported on base plate or table 8 which also supports the motor on frame 8a.

Tooth gear 9 is keyed to and rotates with axle or shaft 5. Gear 9 meshes with tooth gear 10 of shaft 11 which carries wiping or cream removing roller 12, rollers 6 and 12 rotating in opposite directions as indicated by arrows. Shaft 11, carrying wiping roller 12, is pivotally mounted on shaft 5 by means of bearing bar 13. The bearing bar has an end plate 13a with two apertures for holding shafts 5 and 11, respectively, the bar being rotatable or pivotable about shaft 5. The bar 13 and thereby roller 12 are held in the desired horizontal position by adjustment of set screw 14 and counterweight 15 provided at the end of bearing bar 13 opposite to the roller 12. Counterweight 15 may be adjusted to control the pressure of roller 12 upon the cream surface of the jars moving thereunder, the pressure being eased when the counterweight is moved outwardly and roller pivots upwardly around pivot axis 5. In addition, the fine set screw 14 also enables adjustment of the position of roller 12 relative to the jaws. This vertical oscillating movability of roller 12 compensates for slightly uneven jar heights and also makes the use of the machine for jars of different sizes possible.

Cream-filled jars 16 are supported on endless belt or conveyor 17 moving around roll 18, the conveyor being level with a work table 19 whereon the trimmed jars 16a may be placed. The jars are held on the belt between guide rails or tracks 17a so as to be centered in relation to wiping roller 12.

To prevent undesirable splashing of the removed cream and to guide the removed cream in the desired manner, as will be more fully explained hereinafter, roller 12 is provided with circular end disc 20. In addition, an appropriately shaped guard member 21 is mounted on the end disc to close off one end of the channel formed between rollers 6 and 12. Guard member or plate 21 has two circularly curved bottom edges corresponding to the curvatures of the rollers 6 and 12, the plate edges being closely adjacent the circumferences of the rollers. Polyethylene has been found a suitable material for the guard member or plate but other materials may obviously be used.

The excess cream brought into the channel between rollers 6 and 12 is prevented from splashing over the side guarded by plate 21 and moves toward inclined trough or chute 22, down the chute and into bucket 23. Chute 22 is attached to outer bearing bar 24 having an end channel 24a wherein there is mounted compression spring 25, adjustable by set screw 26. Compression spring 25 presses shaft 11 and roller 12 towards roller 6 so that no excess cream can escape between the rollers and splash onto the conveyor and jars therebelow.

It has been found that wiping roller 12 obtains excellent results when made of an acrylic resin, such as sold in the trade under the trademarks "Lucite" or "Plexiglas," although other roller materials may be found advantageous under given circumstances. Rubber, such as synthetic rubber sold under the trademark "neoprene" has been found to be a satisfactory material for squeeze roller 6.

For satisfactory operation of the jar trimmer, it is essential that the surface speed of the wiping roller exceed the linear speed of the jar moving belt. The exact speed differential will depend primarily on the viscosity or consistency of the material to be removed from the jar tops and will be easily established in a short trial run for each material. Generally, it may be stated that the excess material would be merely pushed off the jar top but not removed on the rotating wiping roller if the surface speed of the roller were too slow. If it is too fast, the material would splash off the roller. The ideal speed is obtained when the excess material is picked up and removed by the roller in a wiping and rolling action. For best results in the case of creams used by applicants, the surface speed of roller 12 was about 30 per cent greater than the speed of belt 17.

The wiping roller has been shown as laterally convex since it is desirable to trim cream 27 with a concave surface 27a, as shown in Fig. 3. This will assure that no cream flows over the sides of the jar even when protective cover 28 is placed upon the surface of the cream before jar cover 29 is screwed onto the jar. It is, however, within the purview of the invention to make rollers 6 and 12 purely cylindrical, producing a level surface.

In operation, it may be found desirable to increase or decrease the tension of belt 4 connecting pulleys 2 and 3. For this purpose, motor 1 may be moved on base 8a by turning handle 30 which operates gear 31.

The jar trimmer operates as follows:

First, the distance of wiping roller 12 from the belt 17 is adjusted by means of set screw 14 and counterweight 15 in accordance with the height of the jars to be trimmed. Then, belt 17 is put in operation, filled jars 16 being placed thereon between guide rails 17a. Motor 1 rotates squeeze roller 6, care being taken that the surface speed of the roller exceeds the speed of the belt, preferably by about 30%. The speed of the roller may be regulated by changing the tension of belt 4 by turning handle 30 which moves the motor. Roller 6 rotates in the direction of belt 17 (as shown by the arrows in Fig. 1) and drives roller 12 by means of tooth gears 9, 10. When a jar 16 moves underneath rotating roller 12, the excess cream on top of the jar will be trimmed off in a wiping and rolling motion of the roller and will be carried away and upwardly on the surface of the rotating roller until it reaches the channel between rollers 6 and 12. Full engagement of the two rollers is assured by adjustment of set screw 26 determining the force of compression spring 25. As the excess cream on the surface of roller 12 reaches the channel between rollers 6 and 12, it is squeezed off roller 12 by roller 6. It is prevented from spilling over one side of the channel by guard member or plate 21 and thus is forced toward the other side of the channel and into chute 22 wherefrom it drips into receiving bucket 23.

While the invention has been described and illustrated in connection with a preferred embodiment thereof, it will be understood that various changes and modifications may occur to the skilled in the art without departing from its spirit or scope as defined in the appended claims.

What is claimed is:

1. A machine for leveling the contents of a jar, comprising means for supporting containers or jars filled with a viscous, creamy material, a trimming station, means for continuously moving the container or jar supporting means to, through and from the trimming station, a rotating roller of laterally convex shape, arranged in said trimming station above said containers or jars for removing excess viscous material off the top of the containers or jars and upwardly on the surface of the rotating roller, a squeeze roller having a shaft rotating in the opposite direction in surface engagement with the material removing roller, the rollers forming a channel therebetween and the surface speed of the first-mentioned roller being in excess of the linear speed of movement of the containers or jars through the trimming station, and means for carrying the excess material from the channel between the rollers.

2. A jar leveling machine as defined in claim 1, comprising spring means for maintaining close surface engagement between the rollers.

3. A jar leveling machine as defined in claim 1, comprising means for changing the surface speed of the rollers.

4. A jar leveling machine as defined in claim 1, comprising means for pivotally mounting the first-mentioned roller on the shaft of the squeeze roller, and means for adjusting and setting the pivotal position of the material removing roller.

5. A jar leveling machine comprising means for supporting jars filled with a creamy material, a trimming station, means for continuously moving the jar supporting means to, through and from the trimming station, a squeeze roller of laterally concave shape, driving means for rotating the squeeze roller, a wiping roller of laterally convex shape, gear means connecting the squeeze and the wiping roller to rotate the wiping roller in the opposite direction of rotation of the squeeze roller when the squeeze roller is driven, the wiping roller rotating in the opposite direction of movement of the jars, and at a surface speed in excess of the speed of movement of the jars through the trimming station, and means for maintaining the rollers in close surface engagement at least during rotation, so as to form a channel therebetween, means for adjusting and setting the distance between the jar supporting means and the wiping roller, so that the wiping roller will, upon rotation, remove and roll upwardly on its surface a desired amount of excess material off the top of the jar, and means for carrying from the said channel the excess material scraped off said roller surface by the squeeze roller.

6. A jar leveling machine as defined in claim 5, wherein said jar supporting means is an endless belt.

7. A jar leveling machine as defined in claim 5, wherein said driving and gear means are connected to the shafts of the rollers at one end thereof and there is provided a guard plate between said driving and gear means, on the one hand, and the rollers, on the other hand, to close off the channel formed between said rollers, the means for removing the excess material being positioned at the other end.

8. A jar leveling machine as defined in claim 5, comprising means for changing the surface speed of the rollers.

9. A jar trimmer comprising an endless belt for supporting jars filled with a material of creamy consistency, a trimming station, means for continuously moving the endless belt with the filled jars to, through and from the trimming station, a squeeze roller of laterally concave shape, a driving shaft for said roller, driving means connected to the driving shaft for rotating the squeeze roller in the direction of movement of the endless belt, a wiping roller of laterally convex shape, mounted on a shaft parallel to the driving shaft of the squeeze roller, bearing means for pivotally mounting the shaft of the wiping roller on the shaft of the squeeze roller, means for adjusting and maintaining the pivotal position of the wiping roller so as to determine its distance from the endless belt, gear means connecting the driving shaft of the squeeze roller and the shaft of the wiping roller to rotate the wiping roller in the opposite direction of rotation of the squeeze roller when the squeeze roller is driven, the wiping roller rotating at a surface speed in excess of the speed of movement of the endless belt, spring means for maintaining the rollers in close surface engagement at least during rotation so as to form a channel between the rollers, a guard plate closing off one end of the channel and separating said channel from the driving and gear means, and means mounted at the other end of said channel for removing excess material removed off the top of the jars by the rotating wiping roller and scraped off its surface by the squeeze roller.

10. A jar trimmer as defined in claim 9, wherein said bearing means comprise a bearing bar and said means for adjusting and maintaining the pivotal position of the wiping roller comprises a counterweight movably mounted on said bar and a set screw in engagement with the bar and arranged between its pivot and the counterweight.

11. A jar trimmer as defined in claim 9, comprising means for changing the speed of the driving means.

12. A jar trimmer as defined in claim 9, wherein at least the surface of the wiping roller is of a material harder than rubber while at least the surface of the scraper roller is of a resilient material.

13. A jar leveling machine comprising means for supporting containers or jars filled with a material of creamy consistency, a trimming station, means for continuously moving the container or jar supporting means to, through and from the trimming station, a rotating roller arranged in said trimming station for removing excess material off the top of the containers or jars and upwardly on the surface of the rotating roller, a squeeze roller rotating in the opposite direction and being in close surface engagement with the first rotating roller, a channel being formed between the rollers, means for driving the first-mentioned roller at a surface speed exceeding the linear speed of the movement of the containers or jars through the trimming station.

References Cited in the file of this patent

UNITED STATES PATENTS 2,321,082     Harshberger _____ June 8, 1943